March 19, 1929.  J. R. MILLEN  1,706,245
VEHICLE
Filed Feb. 4, 1926  2 Sheets-Sheet 1

Inventor
James R. Millen
By E. H. Bond
Attorney

Inventor
James R. Millen
By E. K. Bond
Attorney

Patented Mar. 19, 1929.

1,706,245

UNITED STATES PATENT OFFICE.

JAMES ROY MILLEN, OF DEERFIELD, MICHIGAN.

VEHICLE.

Application filed February 4, 1926. Serial No. 85,920.

This invention pertains to vehicles and more particularly to foot-propelled types commonly known as "scooters," and it has for its objects, among others, to provide an unusually desirable form of such vehicle mounted upon four wheels so relatively arranged that a person may assume a propelling position between spaced apart rear wheels and arrange foot and knee rests so as to permit ready change from one foot to the other in effecting movement of the vehicle.

Also, it is an object of the invention to so mount and construct a body or box that it may serve as a carrier for toys or the like and support at either its front or rear end a seat capable of being positioned for use at times as a knee rest for the person propelling the vehicle.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which Figure 1 is a perspective view of my improved vehicle.

Like numerals of reference indicate like parts throughout the several views in which they appear.

Figure 1:
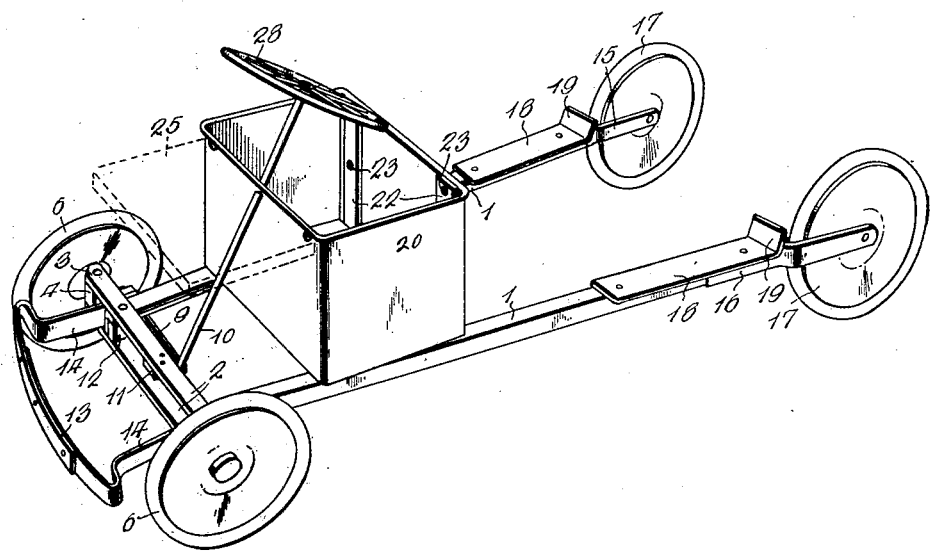
Figure 3:
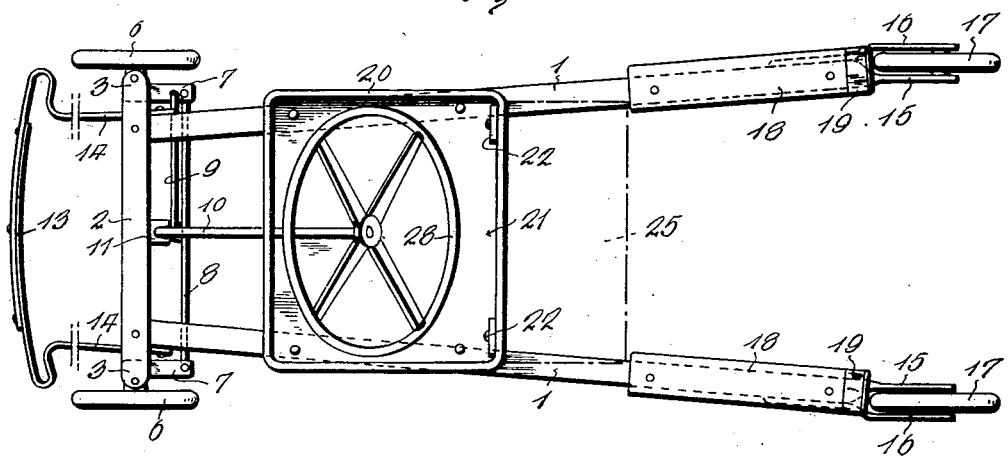
Figure 3 is a plan view of the complete vehicle.
Figure 4:
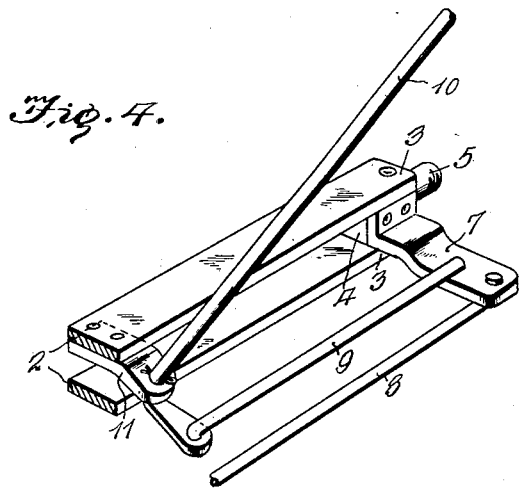
Figure 4 is a fragmentary detail perspective view of the steering mechanism.
Figure 5:
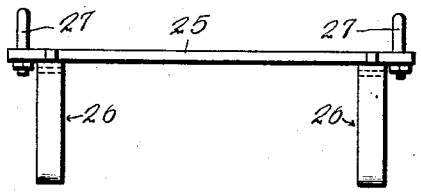
Figure 5 is a front elevation of the removable seat.
Figure 6:
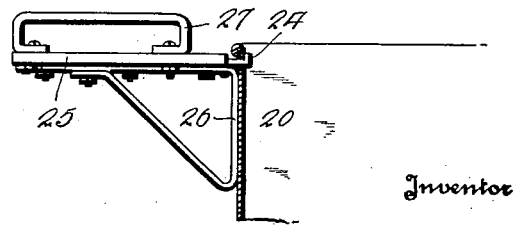
Figure 6 is a vertical section showing the manner of supporting the seat, the latter being in end elevation.

Referring to the drawings 1 designates a pair of transversely spaced horizontal side members preferably formed of angle iron, and being relatively diverged rearwardly as seen in Figure 3. These side members are held rigidly in spaced relation by means of a pair of vertically spaced connecting bars 2 arranged at the forward ends and extending laterally beyond the side members to form spaced bearings 3 between which are pivoted on vertical axes, axle or spindle carrying blocks 4. As will be noted, these spindles 5 mount dirigible supporting wheels 6 and have rearwardly extended steering arms 7 fixed thereto by suitable fasteners, or, quite obviously, may be of integral formation. These steering arms 7 are, as is customary, disposed in parallel relation, and are interconnected by a tie rod 8 of any preferred form, one of the arms 7 also having pivotal connection to one end of a short rod 9 whose other end is pivoted to a steering rod. This steering rod 10 has its lower end rotatably mounted in a rearwardly directed bearing bracket 11, the front end of the latter being riveted or otherwise secured to the lower face of the medial portion of the upper cross bar 2. As will be noted, the lower end of the steering rod 10 is bent rearwardly and flattened horizontally for connection to said short rod 9, fixed relation of the steering arm and bracket being effected by a cotter pin or the like element as will be seen in Figure 4. The cross bars 2 are held in vertical spaced relation through extension therebetween of the front ends of the angle iron side members 1 and filling of the angles between the flanges with filler blocks 12 as shown in Figure 1, these elements being bolted or riveted together.

Arranged in advance of the cross bars 2 is a transversely disposed yieldable bumper 13 which serves the additional function of a foot rest. This bumper is formed with rearwardly directed arms 14 which extend between the aforementioned cross bars 2 and are secured to the outer faces of the side members 1, in any preferred manner.

The rear ends 15 of the side members 1 are offset inwardly, as will be seen in Figure 3, and arranged in parallel relation, and rearwardly coextensive with these offset ends are bearing arms 16 whose front ends are offset inwardly and riveted or welded to the vertical flanges of the side members. These ends 15 and arms 16 are formed with transversely aligned bearings or axle openings to rotatably mount axles of the rear supporting wheels 17. Immediately in advance of these rear wheels 17 are foot rests in the form of elongated plates 18 riveted or welded to the horizontal flanges of the angle side members 1 and having upwardly rearwardly inclined guard flanges 19 which obviously prevent accidental contact between an operator's foot and a rear wheel due to slipping of the foot from the rest.

Arranged rearwardly of and adjacent the connecting bars 2 is a body or box 20 preferably of relatively small proportions and in the form of an open topped approximately square box, although the shape may be varied. This body or box has a heavy substantial bottom 21 which is bolted to the horizontal flanges of the side members 1 thereby co-acting with the cross bars 2 in effecting rigid connection. This feature is clearly shown in Figure 3 of the drawings. It will also be noted that rigidity of the rear end wall of the body is increased through placing stiffening bars 22 vertically of the inner side and near the ends as shown in Figures 1 and 3. These bars 22 and contacting portions of the rear end wall are formed with two vertically spaced sets of openings 23 designed to receive hook fingers 24 projecting from one edge of the combined seat and knee rest 25. As a means for firmly securing the fingers 24 to the seat a substantially triangularly shaped brace member is bolted to the bottom of the seat base and has a depending arm 26 adapted for contact throughout its length with the body wall. Suitable handles 27 are arranged on the upper side of the seat.

It will be noted by reference to Figures 1 and 3 that the aforementioned steering rod 10 is inclined rearwardly and is rotatably mounted in the upper portion of the front wall of the body above which it extends for connection to a hand wheel 28.

Figure 2:
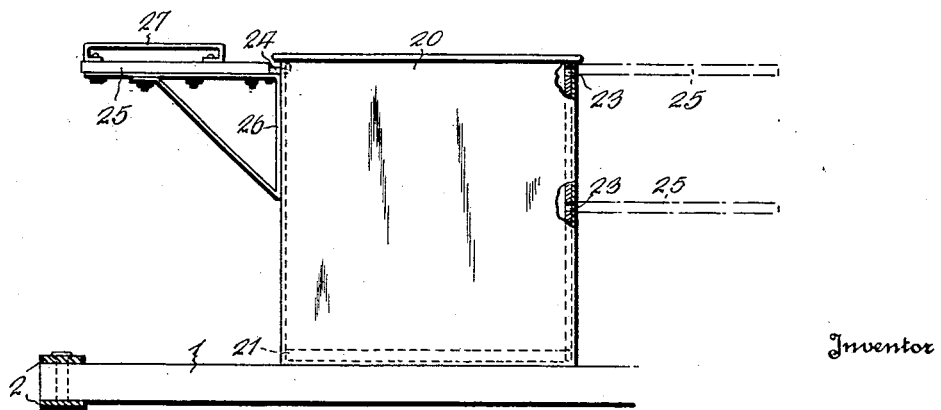
Figure 2 is a detail side elevation of the body or box, with portions in section, showing the several positions which the removable seat may assume.

From the foregoing it will be seen that I have provided a foot propelled vehicle wherein the operator may position himself between wheel supported rearwardly diverging side members, each of which mounts a foot rest, thus permitting use of either foot for propulsion. Further, through attaching the combined seat and knee rest to the medial portion of the rear wall of the body the operator may support one leg or knee thereon while he propels the vehicle with the other and at the same time maintains a central position as regards the path of travel so as to have perfect control at all times. It is also obvious that due to the body formation it may well be used to transport or carry toys etc. and further serve to support in several selective positions a seat or foot rest as shown in Figure 2. When the seat is in the full line position illustrated in the above figure, the bumper also serves as a foot rest for the person riding on the seat.

Modifications in detail, proportions of parts, etc., may be resorted to without departing from the spirit of the invention or sacrificing any of its advantages.

What is claimed as new is:—

1. A vehicle of the class described embodying transversely spaced longitudinal side members, rear supporting wheels and front steering wheels mounted thereon, a body box on the side members and spaced from the front ends thereof, a steering rod mounted intermediate its ends in the front side of said box, a cross bar at the front of the frame, means for mounting the lower end of the steering rod on said bar, means connecting the steering wheels and steering bar, said box having seat-supporting means in its front and rear sides, a removable seat or knee support having supporting means including members adapted to engage said seat-supporting means, whereby the seat may be detachably supported at either the front or rear of the said box.

2. A vehicle of the class described including a pair of horizontal transversely spaced side members with their rear ends diverging outwardly and having integral extensions on their inner edges offset laterally in parallel relation, bearing arms coextensive with said extensions and offset inwardly and mounted on said side members, supporting wheels mounted between said extensions and arms, spaced-apart foot rests overlying said arms and side members and extending laterally beyond the edges thereof, a body box mounted on said side members, a knee rest mounted on the rear side of said box, supporting steering wheels mounted at the front of said side members, and means for steering said wheels, said means extending to the operator's position at the rear of the vehicle.

3. A vehicle in accordance with claim 2 in which the steering means embodies a rod extending in an inclined direction through the front of the said box whereby the rod is stabilized in its movements.

4. A vehicle of the class described including a pair of spaced-apart side members having their rear ends diverging outwardly and offset laterally, offset bearing arms paralleling said offset rear ends and secured to the side members, supporting wheels mounted between said offset side members and said bearing arms, foot rests mounted on the side members and extending laterally beyond the edges thereof, a body box mounted on the front portion of said side members in spaced relation to the foot rests, steering wheels mounted to support the front of said side members, and steering means from said steering wheels to the position of the operator when standing on said foot rests.

In testimony whereof I affix my signature.

JAMES ROY MILLEN.